United States Patent [19]

Jamison et al.

[11] 4,129,663
[45] Dec. 12, 1978

[54] POURABLE SALAD DRESSING COMPOSITION

[75] Inventors: Joel D. Jamison, Wilmington, Del.; Gordon A. Towle, Landenberg, Pa.; J. Gregory Vermeychuk, Wilmington, Del.

[73] Assignee: Hercules Incorporated, Wilmington, Del.

[21] Appl. No.: 852,654

[22] Filed: Nov. 18, 1977

[51] Int. Cl.² ............................................. A23L 1/24
[52] U.S. Cl. ..................................... 426/602; 426/613
[58] Field of Search ................ 426/602, 605, 613, 589

[56] References Cited

U.S. PATENT DOCUMENTS

| | | | |
|---|---|---|---|
| 3,067,038 | 12/1962 | O'Connell | 426/602 |
| 3,892,873 | 7/1975 | Kolen et al. | 426/613 |
| 3,955,010 | 5/1976 | Chozianin et al. | 426/605 |
| 3,968,261 | 7/1976 | Goodman | 426/613 |
| 4,059,458 | 11/1977 | Germino et al. | 426/605 |

Primary Examiner—Jeanette M. Hunter
Attorney, Agent, or Firm—William S. Alexander

[57] ABSTRACT

Pourable salad dressing compositions are disclosed containing a mixture of Xanthan gum and pectin as a stabilizer.

8 Claims, No Drawings

POURABLE SALAD DRESSING COMPOSITION

This invention relates to the preparation of pourable salad dressing compositions.

Pourable liquid or semi-liquid salad dressings have gained substantial commercial acceptance in recent years. Such products as French, blue cheese, Russian, Thousand Island and Roquefort dressing are widely used. Dressings of this type are comprised basically of an edible oil-in-water emulsion containing appropriate other ingredients to give a specific dressing its distinctive character. Other ingredients utilized to accomplish this include, e.g., salt, sugar, dextrose, corn syrup or other sugar source, spices, various acidifying agents such as vinegar or lemon juice, and usually, egg yolks. The contents are controlled and regulated by the U.S. Food and Drug Administration whose regulations define what a salad dressing is and what it may contain.

One necessary ingredient is an emulsification ingredient, ususally referred to as a stabilizer. Stabilizers frequently used heretofore have been gum Tragacanth or combinations of Xanthan gum with gum Tragacanth, propylene glycol alginate, galactomannan gums or emulsifiers such as the ethoxylated sorbitol esters. The Xanthan gum, when used, contributes viscosity to the system and some stability while the other gums generally contribute stability.

Recent large increases in cost and declining quality of gum Tragacanth have prompted activity aimed at replacing gum Tragacanth in many applications, including salad dressings. Xanthan gum alone has not been found satisfactory due to its tendency to impart a highly pituitous flow character to the dressing. Another proposed solution, a combination of Xanthan and propylene glycol alginate, is better, but is not totally satisfactory due to poor stability at the relatively low pH conditions encountered in salad dressings.

It is the object of this invention to provide a novel stabilizer system for use in salad dressing compositions which will exhibit the desirable characteristics of stabilizers which have previously gained commercial acceptance.

In accordance with this invention, it has been found that a mixture of Xanthan gum and pectin imparts excellent stability to salad dressing compositions without causing the objectionable pituity that has heretofore made Xanthan gum unsatisfactory when used alone as a salad dressing stabilizer. At the same time, salad dressings containing the stabilizer of this invention exhibit a pleasing consistency and mouth-feel.

Xanthan gum, or Xanthomonas colloid, is a heteropolysaccharide containing mannose, glucose, glucuronic acid and acetyl groups in a mole ratio of about 2:1:1:1. It is prepared by the fermentation of carbohydrate solutions with bacteria of the genus Xanthomonas. The preferred Xanthomonas bacterium is *X. campestris*, NRRL B-1459. Equally useful gums can be produced, albeit less efficiently, by other *Xanthomonas* species, e.g., *X. carotae, X. phaseoli, X. malvacearum* or *X. bengoniae*.

Pectin is a well-known natural heteropolysaccharide gum consisting primarily of methoxylated polygalacturonic acid radicals. It is well known as a gel former with sugar under acid conditions such as in making jams and jellies. It has also been used as a thickener in salad dressings in combination with gum Tragacanth. Pectin occurs in various types, usually characterized by their methoxyl content. These are identified as low methoxyl having a degree of methoxylation of about 30 to 50% and high methoxyl having a degree of methoxylation (D.M.) of about 50 to 80%. In either type, 20 to 30% of the methoxyl content can be replaced by ammonia to form so-called amidated pectins. The type employed does not appear to be critical in the stabilizer compositions of this invention. Both high and low methoxyl conventional pectins are usable and the amidated types are usable as well.

The Xanthan gum can be used in concentration of about 0.3 to 0.8% of the total dressing. The preferred concentration is about 0.3-0.5%. The pectin concentration is between about 0.2 and 2% of the total dressing and preferably between about 0.3 and 1%. Within these limits substantially any ratio of Xanthan gum to pectin can be used. Normally, the ratio will be about one part Xanthan gum per part of pectin.

The stabilizer system of this invention can be used with both high and low oil dressings. In the trade a dressing having about 3 to 10% oil by weight based on the total ingredients is considered to be a low oil dressing. High oil dressing have about 20 to 35% oil. A low oil dressing can be stabilized with less stabilizer than can a high oil dressing, although the difference is small. Thus, a low oil dressing will require a minimum of about 0.3% Xanthan gum while a high oil dressing will require a minimum of 0.35% based on the total dressing weight.

In addition to Xanthan gum and pectin, the stabilizer can also contain carboxymethyl cellulose (CMC). Addition of CMC further improves the mouth-feel of the dressing in which the stabilizer is incorporated. The stability imparted by such tertiary blends is no less than that from Xanthan and pectin alone. Any of the conventional CMC types having a D.S. of about 0.4 to 1.2 can be used of high, low or medium viscosity grades. When used, CMC can be used in a concentration of about 1 to 30% of the total weight of Xanthan gum and pectin and preferably about 3-10%.

The invention is also applicable to the preparation of dry packaged salad dressing mixes to which the consumer adds the water and oil when he is ready to use the dressing.

In the examples which follow, dressings containing the novel stabilizer system of this invention were prepared and evaluated. Parameters on which the dresssing were evaluated are:

(a) Initial viscosity of the dressing;
 (b) Stability after ten days aging at 55° C. (regarded by those skilled in the art as the equivalent of one year at ambient temperature) against separation of oil and water components;
 (c) Viscosity after the ten-day aging test; Viscosity loss should be <25%;
 (d) Emulsion stability following four freeze-thaw cycles; and
 (e) Mouth-feel, tested subjectively by experienced tasters and compared with conventional commercial dressings.

In the examples, all parts and percentages are by weight.

EXAMPLE 1

A French dressing was prepared using the following ingredients:

|  | % | Parts |
|---|---|---|
| Water | 54.84 | 329.04 |
| Oil | 10.00 | 60.00 |
| Vinegar | 16.00 | 96.00 |
| Salt | 3.50 | 21.00 |
| Sugar | 6.50 | 39.00 |
| Garlic powder | 0.02 | 0.12 |
| Onion powder | 0.04 | 0.24 |
| Dried Mustard | 0.40 | 2.40 |
| Paprika | 0.60 | 3.60 |
| Tomato paste | 7.50 | 45.00 |
| Xanthan gum | 0.30 | 1.80 |
| Pectin | 0.30 | 1.80 |
|  | 100.00 | 600.00 |

The pectin employed in this instance was a high methoxyl slow set type product having a D.M. of 65. The Xanthan gum was a food grade material produced by culturing *X. campestris*.

The dry ingredients were weighed out and thoroughly blended, the added to water in a conventional kitchen-type blender. Oil and vinegar were added. When thoroughly blended, the mixture was transferred to a homogenizer and homogenized for one minute. After homogenization, the viscosity was 1499 cps.

The dressing was subjected to four freeze-thaw cycles, then allowed to sit for 24 hours. After the fourth thaw, it showed no separation at the bottom or top of the container. Its viscosity at this point was 1475 cps. After storage at 55° C. for 10 days, the dressing showed no separation at the bottom of the container with a very small water layer at the top. Its viscosity was 1225 cps., a loss of about 17% from the original.

The taste and mouth-feel of this dressing were judged to be substantially the same as a French dressing containing 0.8% gum Tragacanth. It poured smoothly from the container and broke cleanly when pouring stopped.

EXAMPLE 2

Using the procedure of Example 1, a Thousand Island dressing of the following formulation was prepared:

|  | % | Parts |
|---|---|---|
| Minced onion | 0.4 | 2.4 |
| Mustard powder | 0.5 | 3.0 |
| Egg yolk | 2.0 | 12.0 |
| Lemon juice | 2.0 | 12.0 |
| Drained pickle relish | 3.5 | 24.0 |
| Salt | 4.5 | 18.0 |
| Tomato paste | 4.0 | 30.0 |
| Oil | 10.0 | 60.0 |
| Vinegar (10%) | 12.0 | 72.0 |
| Water | 55.5 | 333.0 |
| Sugar | 5.0 | 30.0 |
| Xanthan gum | 0.3 | 1.8 |
| Pectin | 0.3 | 1.8 |
|  | 100.0 | 600.0 |

The same Xanthan gum was employed in this dressing as was employed in Example 1. The pectin was a high methoxyl type product having a D.M. of 55 (A.S. confectionary). The initial viscosity of the dressing was 2705 cps.

After four freeze-thaw cycles, substantially no separation was visible in this dressing.

After 13 days' storage at 55° C., the viscosity of this dressing was 2500 cps., a loss of only about 8%.

EXAMPLE 3

A high oil Italian dressing was prepared with the following formulation:

|  | % | Parts |
|---|---|---|
| Soybean oil | 26.9 | 180.0 |
| Water | 53.2 | 356.4 |
| Sugar | 1.3 | 9.0 |
| Egg yolk | 1.8 | 12.0 |
| Garlic powder | 0.4 | 2.4 |
| Onion powder | 0.3 | 1.8 |
| Italian spices | 0.1 | 0.9 |
| Lemon juice | 2.7 | 18.0 |
| 10% vinegar | 10.7 | 72.0 |
| Salt | 2.2 | 15.0 |
| Xanthan gum | 0.3 | 1.8 |
| Pectin | 0.3 | 1.8 |

The ingredients were mixed in the manner described for the previous examples using the same Xanthan gum and the same pectin.

The initial viscosity of this dressing was 1290 cps. After 10 days at 55° C., the viscosity was 1030 cps. or 80% of the original. There was no indication of separation into oil and aqueous layers.

After four freeze-thaw cycles, there was only slight separation of the liquid phase, i.e., about 0.2 cm. separation on the lower end of an 8.2 cm. bottle of dressing.

EXAMPLE 4

The dressing of Example 1 was prepared using high methoxyl pectin having a D.M. of about 55. The initial viscosity of this dressing was about 1537 cps. After four freeze-thaw cycles, the viscosity was 1455 cps. There was virtually no evidence of separation of the emulsion.

After 10 days' storage at 55° C., the viscosity was 1220 cps., a loss of about 21% from the original. Here again, there was no evidence of separation. Taste and mouth-feel were comparable to that of a dressing based on a Xanthan/gum Tragacanth stabilizer.

When the above formulation was prepared using 1.7 parts of each gum plus 0.1 part high viscosity carboxymethyl cellulose of D.S. 0.7, the dressing was higher in initial viscosity with equal stability. Taste and mouth-feel were equivalent to a dressing using Xanthan/gum Tragacanth stabilizer.

EXAMPLE 5

Using the basic French dressing formulation set out in Example 1, a series of dressing was prepared containing 0.4% pectin and varying the Xanthan gum concentration. When gum concentrations were increased, the amount of water was decreased while the ratios of other ingredients remained the same. These dressings were evaluated in the same way as was reported in previous examples. Results are recorded in the following table.

| % Xanthan | Viscosity | | | Stability | | Remarks |
|---|---|---|---|---|---|---|
|  | Initial | After F/T* | After Heat Aging** | After F/T | After Aging |  |
| 0.5 | 3055 | 2860 | 2390 | No top or bottom separation; oil drops on top. | No top or bottom separation; small oil drops on top. | All excellent stability. |
| 0.6 | 3855 | 3600 | 2975 |  |  |  |
| 0.7 | 4840 | 4470 | 3585 |  |  |  |

| % Xanthan | Viscosity | | | Stability | | Remarks |
|---|---|---|---|---|---|---|
| | Initial | After F/T* | After Heat Aging** | After F/T | After Aging | |
| 0.8 | 5760 | 5400 | 4250 | | | |

*F/T indicates four freeze-thaw cycles.
**14 days at 49° C. (120° F.)

EXAMPLE 6

Using the French dressing formulation set out in Example 1, a series of dressings was prepared containing 0.4% Xanthan gum and the pectin content was varied. Again, as gum concentration increased, water was decreased. Results are shown in the following table.

| % Pectin | Viscosity | | | Stability | | Remarks |
|---|---|---|---|---|---|---|
| | Initial | After F/T* | After Heat Aging** | After F/T | After Aging | |
| *0.2 | 2010 | 1910 | 1735 | No top or bottom separation; oil drops on top. | *Slight separation throughout. | *Good stability. |
| 0.6 | 2305 | 2460 | 2175 | | No top or bottom separation; oil drops on top. | Excellent stability. |
| 0.8 | 2575 | 2785 | 2335 | | | |
| 1.0 | 2880 | 3190 | 2470 | | | |
| 1.5 | 3800 | 4235 | 3190 | | | |
| 2.0 | 5940 | 5850 | 4050 | | | |

*F/T indicates four freeze-thaw cycles.
**14 days at 49° C. (120° F.)

What I claim and desire to protect by Letters Patent is:

1. In a low pH, liquid, pourable salad dressing composition consisting essentially of an oil-in-water emulsion, a stabilizer therefor, and appropriate seasonings to impart to said dressing a distinctive flavor characteristic, the improvement which comprises adding as said stabilizer about 0.3% to 0.8% Xanthan gum and 0.2 to 2% pectin, based on the total weight of said salad dressing and thereby imparting freeze-thaw stability thereto.

2. The dressing of claim 1 wherein the pectin has a degree of methoxylation of about 30 to 50%.

3. The dressing of claim 1 wherein the pectin has a degree of methoxylation of about 55 to 80%.

4. The dressing according to claim 1 wherein the Xanthan gum concentration is about 0.3 to 0.5% and the pectin concentration is about 0.3 to 1%.

5. The dressing according to claim 4 wherein the ratio of Xanthan gum to pectin is about 1 to 1.

6. The dressing of claim 4 wherein the pectin has a degree of methoxylation of about 30 to 50%.

7. The dressing of claim 4 wherein the pectin has a degree of methoxylation of about 55 to 80%.

8. The dressing according to claim 1 containing additionally about 1 to 30% carboxymethyl cellulose based on the combined weight of the Xanthan gum and pectin.

* * * * *